Oct. 14, 1958         W. R. FOWLER        2,856,196
STABILIZER ASSEMBLY FOR IDLER ARMS OF
VEHICLE STEERING MECHANISM
Filed March 27, 1957
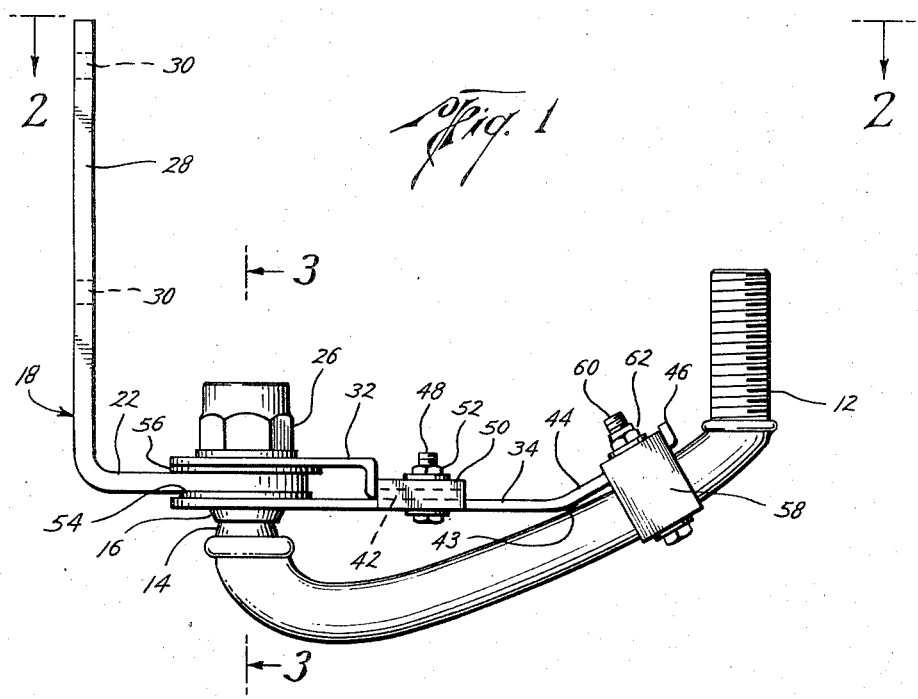
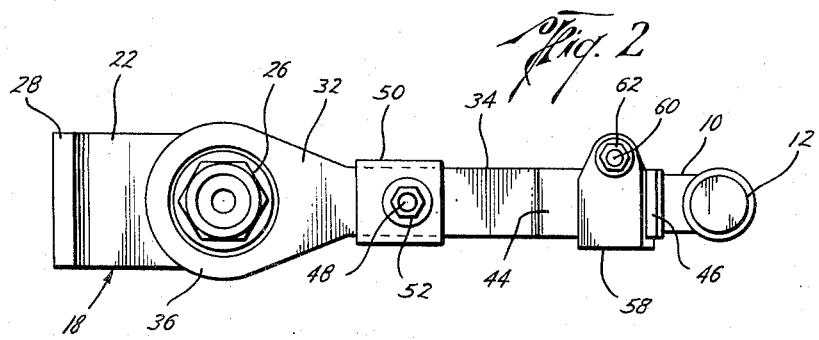
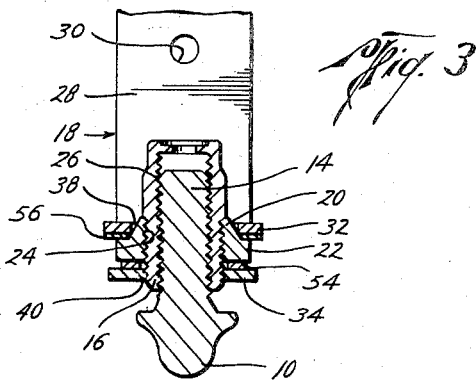
William R. Fowler
INVENTOR.
BY Charles E. Lightfoot
ATTORNEY

United States Patent Office 2,856,196
Patented Oct. 14, 1958

2,856,196

STABILIZER ASSEMBLY FOR IDLER ARMS OF VEHICLE STEERING MECHANISM

William R. Fowler, Houston, Tex., assignor of forty-five percent to L. R. Holberg, Houston, Tex.

Application March 27, 1957, Serial No. 648,956

5 Claims. (Cl. 280—95)

The invention relates to a stabilizer assembly for idler arms of vehicle steering mechanism and more particularly to a device designed to be applied to an idler arm of the steering linkage mechanism of an automobile to prevent loose play in the connection between the idler arm and the vehicle frame and to stabilize the arm against wobbling or gyratory movement.

In the steering mechanism of automobiles, as commonly constructed, a system of links and levers is employed embodying an idler arm which is pivotally connected to the frame of the vehicle for horizontal swinging movement and which also has a pivotal connection with a component of the system and serves as a support therefor.

Idler arm mechanism of this kind is subject to the disadvantage that the development of slight loose play in the pivotal connection between the idler arm and the frame of the vehicle results in wobbling or gyratory movement of the arm which causes uneven wear on the tires. The character of the linkage system of automobile steering mechanism as commonly constructed is such that only a slight amount of loose play in the idler arm assembly results in greatly increased wear on the tires and the rapid development of loose play in the connection frequently requires replacement of the idler arm assembly.

The present invention has for an important object the provision of a stabilizer assembly designed to be applied to an idler arm assembly and whereby wobbling or gyratory movement of the idler arm is effectively prevented.

Another object of the invention is the provision of stabilizer means for idler arms which may be easily and quickly applied to an idler arm assembly and by which loose play in the pivotal connection between the idler arm and the frame of the vehicle is continuously taken up so that wear in the connection cannot result in wobbling of the idler arm.

A further object of the invention is to provide a stabilizer assembly for idler arm mechanism of the character referred to which is of simple design and rugged construction, having few parts and which is capable of withstanding the extreme conditions of wear and hard usage to which apparatus of this kind is customarily subjected.

The above and other important objects and advantages of the invention may best be understood from the following detailed description, constituting a specification of the invention, when considered in conjunction with the annexed drawings, wherein:

Figure 1 is a side elevational view illustrating a preferred embodiment of the invention and showing the same as applied to an idler arm assembly;

Figure 2 is a top plan view of the invention as illustrated in Figure 1; and

Figure 3 is a cross-sectional view taken along the line 3—3 of Figure 1, looking in the direction indicated in the arrows.

Referring now to the drawings in greater detail, the invention is illustrated herein in connection with its application to an idler arm assembly of conventional design forming a part of steering mechanism of usual construction of an automobile.

As illustrated in the drawings the idler arm assembly comprises an idler arm 10, which is of generally curved configuration, having a threaded portion 12 at one end for connection to a component of the linkage system of steering mechanism of usual construction, not shown, and also having a threaded end portion 14 which is threadably connected to an internally threaded sleeve element 16 carried on an angle bracket 18 constituting a support by which the assembly is secured to the frame of a vehicle. The angle bracket 18 has an upstanding annular projection 20 formed on its horizontally positioned arm 22, which is extremely upwardly tapered, and which surrounds an internally threaded opening 24 in the horizontal arm of the bracket. The sleeve element 16 is externally threaded and is threadably extended through the opening 24 and has at its upper end a nut shaped head 26 for engagement with the projection 20 and by which the sleeve may be rotated by any suitable means, such as a wrench, to secure the sleeve to the bracket.

The bracket or support 18 has a vertically positioned arm 28 which may be provided with suitable perforations, such as those indicated at 30, through which bolts may be extended to attach the bracket to an adjacent frame element of the vehicle, not shown.

The above described idler arm assembly is of conventional construction not forming any part of the present invention, but to which the stabilizer assembly of the invention is applied. The idler arm assembly arrangement is such that the idler arm 10 may rotate horizontally, the threaded end portion 14 rotating in the internally threaded sleeve 16.

Any loose play between the internal threads of the sleeve element 16 and the threads of the end portion 14 of the idler arm will result in wobbling or gyratory movement of the idler arm, which motion is transmitted through the linkage system of the steering mechanism so that the front wheels of the vehicle may move in a manner to cause uneven wear on the tires.

It is the chief object of the present invention to provide stabilizer means whereby any such loose play in the idler arm assembly will be prevented.

The stabilizer assembly of the invention comprises upper and lower plate-like members 32 and 34, respectively, each having a widened end portion such as that shown at 36 on the upper member 32, provided with an opening therethrough such as the openings 38 and 40, respectively, as seen in Figure 3.

The member 32 has an offset outer end portion 42, offset downwardly from the widened portion 36 thereof, in position for engagement with the upper face of the member 34, and the member 34 extends outwardly beyond the member 32 and is bent as indicated at 43 to provide an upwardly directed portion 44 whose outer end is upturned as indicated at 46.

The member 32 has a perforation in the offset portion 42 thereof which is positioned for registration with a similar perforation in the member 34 and through which perforations a bolt 48 may be extended. The bolt also extends through a perforation in the bottom wall of a clip 50 of inverted channel shape between whose side walls the members 32 and 34 are fitted and the bolt is provided with a nut 52 whereby the members are secured together.

In applying the stabilizer assembly to the idler arm the end portion 14 of the idler arm is threaded out of the sleeve 16 and the portion 14 is extended through the opening 40 of the lower member 34 with the lower surface of the lower member at the bend 43 in contact with the idler arm at a point remote from the end portion 14. A washer 54 is then placed on the portion 14 on top of the member 34 and the portion 14 is threaded into the sleeve 16. Another washer 56 is placed on the upwardly tapering projection 20 of the angle bracket 18 and the upper member 32 is placed over the projection 20 with the projection extending through the opening 38, and the offset portion 42 overlying the lower member 34. The clip 50 is then placed over the members with the members fitted between the side walls of the clip and the bolt 48 inserted through the perforations of the members and clip. The nut 52 may then be tightened on the bolt to secure the members together. A U-shaped clip 58 is then placed on the idler arm and extending over the upwardly directed outer end portion 44 of the lower member 34. The clip 58 has aligned openings in its opposite arms through which a bolt 60 may be extended which is provided with a nut 62 which may be tightened to clamp the lower member on the idler arm.

The offset portion 42 of the upper member 32 is offset from the plane of the widened portion 36 thereof at a distance to cause the members to be drawn together by the bolt 48 to clamp the upper and lower washers 56 and 54 against the upper and lower faces respectively of the horizontal arm 22 of bracket 18, and because of the upwardly directed outer end portion 44 of the lower member 34, which is at an angle to the portion of the idler arm beyond the point at which the bend 43 engages the idler arm, the tightening of the bolt 60 results in the application of a force to the bracket and idler arm through the members which holds the idler arm against wobbling or gyratory motion while at the same time permitting the idler arm to rotate freely horizontally.

While the invention has been disclosed herein in connection with a particular embodiment of the same, it will be understood that this is intended by way of illustration only and that numerous changes can be made in the construction and arrangement of the various parts within the spirit of the invention and the scope of the appended claims.

It will thus be seen that the invention constructed and applied as described above provides a stabilizer assembly for the idler arms of vehicle steering mechanism which is of simple design and economical manufacture and by which wobbling of the idler arm due to loose play may be effectively prevented.

Having thus clearly shown and described the invention what is claimed as new and desired to secure by Letters Patent is:

1. In vehicle steering mechanism the combination with a support adapted to be secured to the frame of a vehicle and having a horizontally disposed flange, a vertically disposed sleeve carried on the flange and extending above and below the flange and an idler arm rotatably supported at one end in the sleeve for horizontal swinging movement and whose other end extends radially beyond the flange, of stabilizer means comprising upper and lower members rotatably supported at one end on the sleeve above and beneath said flange and whose other ends extend radially beyond the flange, means for connecting the members together and means for connecting one of the members to the idler arm.

2. In vehicle steering mechanism the combination with a support adapted to be secured to the frame of a vehicle and having a horizontally disposed flange, a vertically disposed sleeve carried on the flange and extending above and below the flange and an idler arm rotatably supported at one end in the sleeves for horizontal swinging movement and whose other end extends radially beyond the flange, of stabilizer means comprising upper and lower members rotatably supported at one end on the sleeve above and beneath said flange and whose other ends extend radially beyond the flange, means for connecting the members together beyond the flange, one of said members extending radially beyond the other of the members and means for connecting said one member to the idler arm at a point radially beyond said other member.

3. In vehicle steering mechanism the combination with a support adapted to be secured to the frame of a vehicle and having a horizontally disposed flange, a vertically disposed sleeve carried on the flange and extending above and below the flange and an idler arm rotatably supported at one end in the sleeve for horizontal swinging movement and whose other end extends radially beyond the flange, of stabilizer means comprising upper and lower members rotatably supported at one end on the sleeve above and beneath said flange and whose other ends extend radially beyond the flange, means disposed between and in frictional contact with the flange and each of said members to yieldingly resist rotative movement of the members on the sleeve, means for securing the members together and means for connecting one of the members to the idler arm at a point beyond said flange.

4. In vehicle steering mechanism the combination with a support adapted to be secured to the frame of a vehicle and having a horizontally disposed flange, a vertically disposed internally threaded sleeve carried on the flange and extending above and below the flange and an idler arm having a threaded end portion threadably extended into and rotatable in said sleeve and whose other end extends radially beyond said flange, of stabilizer means comprising upper and lower members rotatably supported at one end on the sleeve above and beneath said flange, and whose other ends extend radially beyond the flange, friction elements on the flange positioned between the flange and members, means for clamping the members together to clamp said elements into frictional engagement with the flange and members, and means for connecting one of said members to the idler arm for movement with the arm.

5. In vehicle steering mechanism the combination with a support adapted to be secured to the frame of a vehicle and having a horizontally disposed flange, a vertically disposed internally threaded sleeve carried on the flange and extending above and below the flange and an idler arm having a threaded end portion threadably extended into and rotatable in said sleeve, and whose other end extends radially beyond said flange, of stabilizer means comprising upper and lower members rotatably supported at one end on the sleeve above and beneath said flange and whose other ends extend radially beyond the flange, friction means on the flange positioned between the flange and members, means for connecting the members together beyond the flange, one of said members being bent away from said arm at a point radially outwardly beyond the other of said members and means for clamping said one of said members to the arm radially outwardly of said point to apply a force to said members in a direction to increase the frictional contact between said friction means and said flange and members.

References Cited in the file of this patent

UNITED STATES PATENTS

| 1,509,031 | Sandstrom | Sept. 16, 1924 |
| 1,641,038 | Koppin | Aug. 30, 1927 |
| 2,588,544 | Langer | Mar. 11, 1952 |

FOREIGN PATENTS

| 485,556 | Canada | Aug. 12, 1952 |